United States Patent
Kupper (10) Patent No.: US 10,352,452 B2
(45) Date of Patent: Jul. 16, 2019

(54) FACE SEAL WITH ENERGIZED LIP AND COUNTERFACE

(71) Applicant: Caterpillar Inc., Peoria, IL (US)

(72) Inventor: David G. Kupper, Edelstein, IL (US)

(73) Assignee: Caterpillar Inc., Deerfield, IL (US)

( * ) Notice: Subject to any disclaimer, the term of this patent is extended or adjusted under 35 U.S.C. 154(b) by 311 days.

(21) Appl. No.: 15/276,499

(22) Filed: Sep. 26, 2016

(65) Prior Publication Data

US 2018/0087668 A1  Mar. 29, 2018

(51) Int. Cl.

| | | |
|---|---|---|
| *F16C 11/04* | (2006.01) | |
| *F16J 15/3284* | (2016.01) | |
| *F16J 15/3204* | (2016.01) | |
| *F16J 15/3268* | (2016.01) | |
| *F16J 15/34* | (2006.01) | |

(52) U.S. Cl.
CPC .......... *F16J 15/3284* (2013.01); *F16C 11/04* (2013.01); *F16J 15/3204* (2013.01); *F16J 15/3268* (2013.01); *F16J 15/344* (2013.01)

(58) Field of Classification Search
CPC ...... F16J 15/3284; F16J 15/28; F16J 15/3204; F16J 15/3268; F16J 15/3208; F16J 15/344; F16C 33/74; F16C 11/02; F16C 11/04; F16C 11/045; E02F 9/006; Y10T 403/32606; Y10T 403/32877; Y10T 403/32893; Y10T 403/32926; E21B 10/25
See application file for complete search history.

(56) References Cited

U.S. PATENT DOCUMENTS

| | | | | |
|---|---|---|---|---|
| 3,874,680 | A * | 4/1975 | Mustoe | F16J 15/3496 277/405 |
| 4,092,054 | A | 5/1978 | Dye | |
| 4,183,542 | A | 1/1980 | Quartara | |
| 4,262,914 | A * | 4/1981 | Roley | F16J 15/344 277/381 |
| 4,331,339 | A * | 5/1982 | Reinsma | F16J 15/3496 277/380 |
| 4,436,315 | A * | 3/1984 | Hatch | F16J 15/344 277/370 |
| 4,457,521 | A | 7/1984 | Morley | |
| 4,819,999 | A * | 4/1989 | Livesay | B62D 55/0887 277/381 |
| 4,824,123 | A * | 4/1989 | Chia | E21B 10/25 175/371 |
| 5,826,884 | A * | 10/1998 | Anderton | B62D 55/0887 277/396 |
| 6,102,408 | A * | 8/2000 | Anderton | B62D 55/0887 277/370 |
| 6,478,388 | B2 | 11/2002 | Maguire | |
| 8,991,944 | B2 * | 3/2015 | Hisamatsu | B62D 55/0887 305/104 |
| 9,138,805 | B2 | 9/2015 | Wodrich | |

(Continued)

FOREIGN PATENT DOCUMENTS

WO  8900523  1/1989

*Primary Examiner* — Jonathan P Masinick
(74) *Attorney, Agent, or Firm* — Law Office of Kurt J. Fugman LLC (57) ABSTRACT

A seal assembly for use in a dynamic pin joint defining axial and radial directions comprises a counterface seal ring subassembly including a counterface seal ring member that includes a radially extending planar seal face and a first contoured load ring interface, and a first load ring.

16 Claims, 5 Drawing Sheets

(56) References Cited

U.S. PATENT DOCUMENTS

| | | |
|---|---|---|
| 2004/0201175 A1 | 10/2004 | Buchmann et al. |
| 2006/0022411 A1* | 2/2006 | Beardsley ............. F16J 15/344 |
| | | 277/345 |
| 2012/0155953 A1 | 6/2012 | Khare et al. |
| 2012/0161399 A1 | 6/2012 | Kupper et al. |
| 2015/0298750 A1 | 10/2015 | Hirota et al. |

* cited by examiner

FACE SEAL WITH ENERGIZED LIP AND COUNTERFACE

TECHNICAL FIELD

The present disclosure relates generally to a pin joint for machinery. More specifically, the present disclosure relates to oscillating pin joints of machinery such as construction equipment, mining equipment, and the like.

BACKGROUND

Pin joints for machinery generally fall into two categories. Dynamic joints where structural members move relative to each other and static joints where the structural members do not move. When dynamic joints are present, they may move back and forth making oscillatory motion. As can be imagined, this creates friction and wear that may limit the life of the pin joint. Consequently, the art has developed schemes to limit this friction and prolong the life of the pin joint.

Oscillating pin joints in construction and mining equipment typically include a pin and a mating bearing that is press fit into the surrounding structure. The joint comprises a middle structural member, often referred to as the bearing housing, and outside structural members on either side of the bearing housing. The bearing housing and the outside structural members will often rotate relative to each other a certain amount when the linkages of the boom of the machine extend. This rotation is reversed when the linkages of the machine retract. Hence, these joints have an oscillating rotating motion.

Lubricant is typically employed in these joints to reduce friction and prolong the life of the joint. The seam formed between the outside structural member and the bearing housing needs to be sealed to prevent the loss of the lubricant while still allowing the oscillating motion to occur between the bearing housing and the outside structural member. Duo cone seals are often used in such joints that employ two symmetrically arranged metal seal members that are urged into contact with each other using resilient load rings. However, it has been determined that such duo cone seals are better suited for applications where continuous rotation in one direction occurs rather than reversing or oscillating motion.

As can be imagined, seal failure or seals having a limited life may increase the amount of maintenance that is needed to keep a machine up and running. This may lead to increased maintenance costs and lost profits for a construction, earth moving or mining endeavor or the like. Therefore, it is desirable to develop a dynamic oscillating pin joint for machinery that is more robust than has yet been devised.

SUMMARY OF THE DISCLOSURE

A seal assembly for use in a dynamic pin joint defining axial and radial directions is provided. The seal assembly comprises a counterface seal ring subassembly including a counterface seal ring member that includes a radially extending planar seal face and a first contoured load ring interface, and a first load ring.

A pin joint for a machine is provided. The pin joint comprises a pin defining an axial direction and a radial direction, a first member that defines a first seal groove, a second member that defines a second seal groove, a seal assembly including a counterface seal ring subassembly disposed in the first seal groove of the first member, the counterface seal ring sub assembly including a counterface seal ring member that includes a radially extending planar seal face and a first contoured load ring interface, and a first load ring. Also, the pin joint comprises a lip seal ring subassembly disposed in the second seal groove of the second member, the lip seal ring subassembly including a lip seal ring member that includes a lip sealing feature and a second contoured load ring interface, and a second load ring, wherein the first and second members rotate relative to each other and the first load ring engages the first contoured load ring interface of the counterface seal ring member and the second load ring engages the second contoured load ring interface of the lip seal ring member.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of the present disclosure provide an improved face seal design. In certain embodiments of the present disclosure, both the seal lip and the seal counterface of the seal assembly are energized by rubber load rings. This may improve the capability to compensate for the axial motion of various components of the seal assembly.

In other embodiments of the present disclosure, the seal counterface is a discrete component, which is not integrated into a larger, expensive component such as a bushing. This may allow the seal counterface to be enhanced using additional features such as plating, coating, or the use of a different material to be modularized and separate from main component. Thus, certain seal assemblies of the present disclosure may have the ability to customize the seal counterface material or surface treatment as needed per a particular application.

In yet further embodiments of the present disclosure, the seal lip and the seal counterface are significantly larger radially than some prior art seal assemblies. That is to say, there is a greater surface area in the radial direction that may be used to create the fluid tight seal. Consequently, these seal assemblies may allow for improved radial motion compensation as components of the seal assembly move radially for various reasons.

Figure 1:
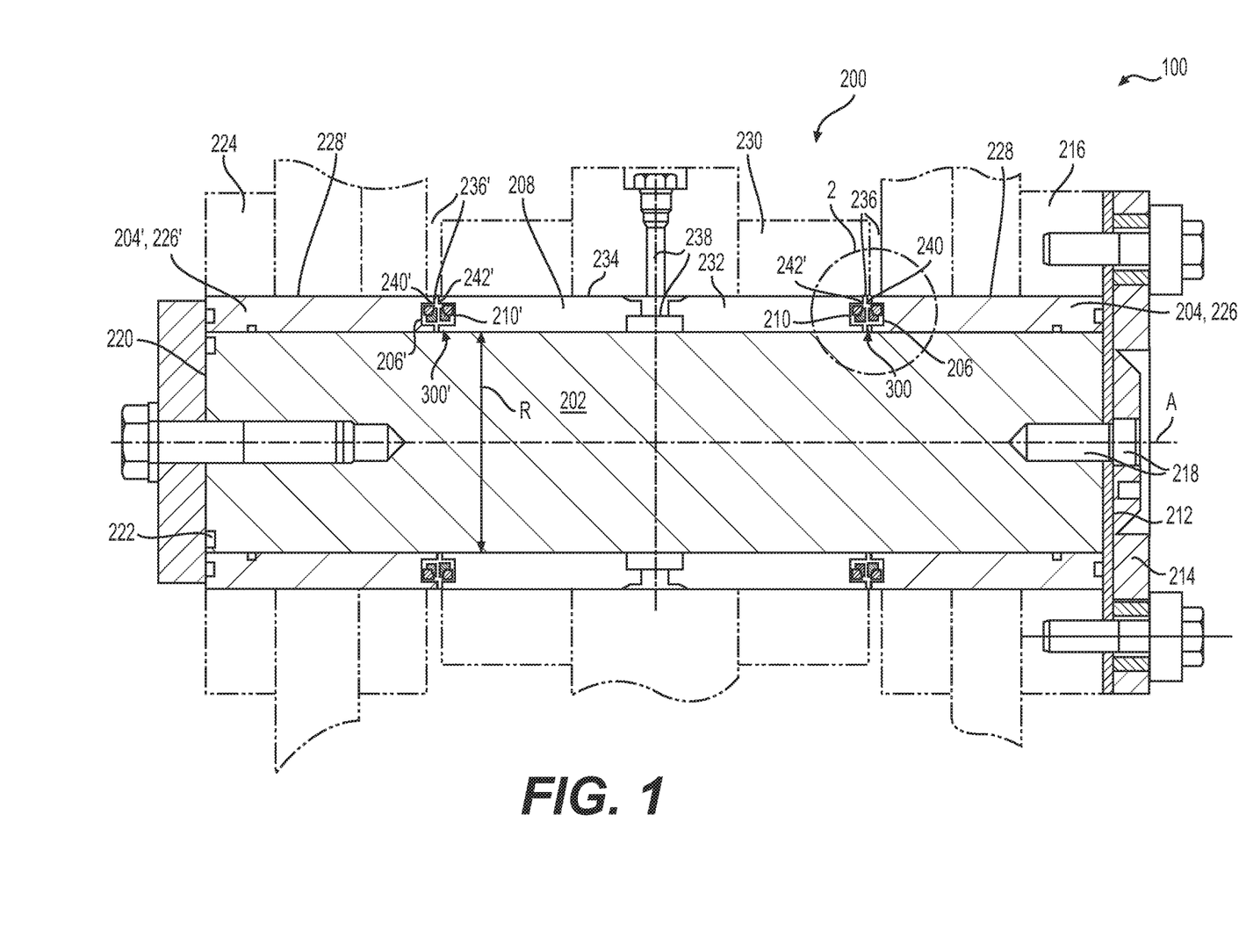
FIG. 1 is a sectional view of an oscillating pin joint using a seal assembly according to an embodiment of the present disclosure.
Figure 2:
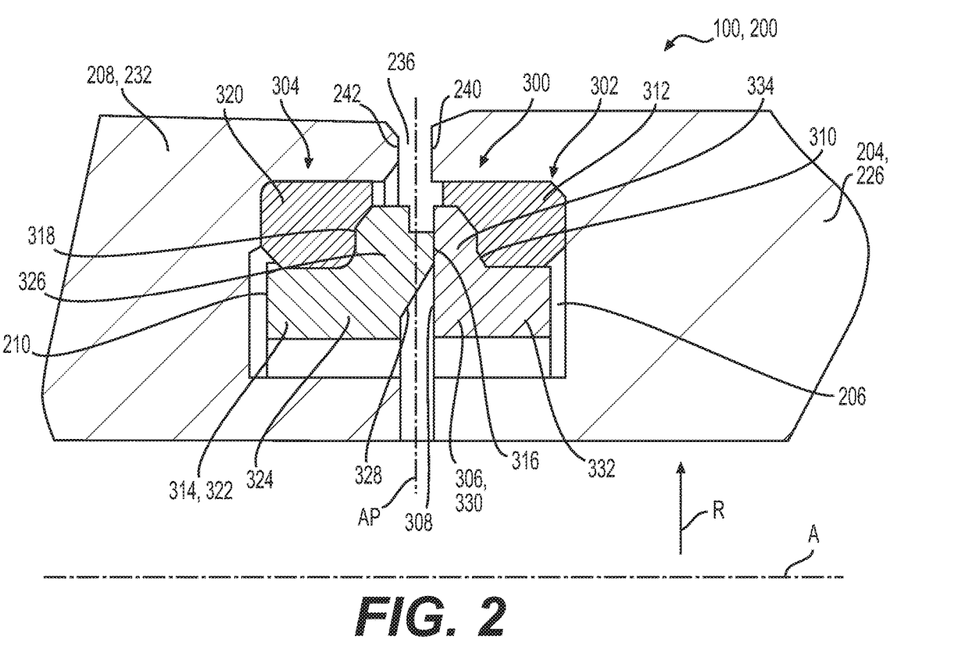
FIG. 2 is an enlarged detail view of the seal assembly of FIG. 1.

Looking at FIGS. 1 and 2, a pin joint 200 for a machine 100 is illustrated, wherein the pin 202 defines radial R and axial A directions. The pin joint comprises a first member 204 that defines a first seal groove 206, a second member 208 that defines a second seal groove 210, and a seal assembly 300 that includes a counterface seal ring subassembly 302 and a lip seal ring subassembly 304. The counterface seal ring subassembly 302 is disposed in the first seal groove 206 of the first member 204, and includes a counterface seal ring member 306 that with a radially extending planar seal face 308 and a first contoured load ring interface 310, and a first load ring 312. The lip seal ring subassembly 304 is disposed in the second seal groove 210 of the second member 208, and includes a lip seal ring member 314 with a lip sealing feature 316 and a second contoured load ring interface 318, and a second load ring 320. The first and second members 204, 208 are free to rotate relative to each other and the first load ring 312 engages the first contoured load ring interface 310 of the counterface seal ring member 306 and the second load ring 320 engages the second contoured load ring interface 318 of the lip seal ring member 314. Together, these load rings 312, 320 provide the necessary axial force and radial force to allow the seal assembly 300 to provide an effective fluid tight seal. Also, these load rings 312, 320 as well as the resilient or flexible lip seal ring member 314 allow a suitable amount of variance in the position of the seal components in the axial A and radial R directions as the components move in use.

Focusing on only FIG. 1, a more detailed description of the components of this particular pin joint 200 will now be described. It is to be understood that this by way of example only and that the seal assemblies described herein may be used in all sorts of pin joints used by all sorts of machines. For this joint 100, the pin extends along the axial direction A from one end of the pin joint 100 to the other. At the first end of the pin 212, a flag plate 214 is fastened to the first outer structural member 216 preventing movement of the flag plate 214. Fastening apertures 218 are provided in the center of the flag plate 214 and the adjacent end 212 of the pin 202 so that the pin 202 may be fastened to the flag plate 214, prevent movement of the pin 202. Similarly, the other end 220 of the pin 202 is fastened using a cap screw to an attachment plate 222 that is attached to a second outer structural member 224 adjacent the other end 220 of the pin 202, preventing movement of the pin 202 in an axial A direction toward the flag plate 214. Collars 226 are provided that are disposed within bores 228 of the first and second outer structural members 216, 224 and that surround the pin 202.

A middle structural member, often referred to as the bearing housing 230, is located between the first and second outer structural members 216, 224. A bearing or bushing 232 is disposed in a bore 234 of the bearing housing 230 such as by using a press fit. A seam 236 is formed between each collar 226 and the bushing 232, as well as the bearing housing 230 and each outer structural member 216,224.

Rotation back and forth about the axis A of the pin 202 is needed for this particular joint 200 to work as will be more fully described later herein. Also, lubrication grooves 238 are disposed in the bearing housing 230 and the bushing 232 to allow lubricant to flow in-between the bushing 232 and the pin 202. Of course, it is desirable to prevent the lubricant from flowing out the seam 236 between the bearing housing 230 and the outer structural member 216, 224. Hence, a seal assembly 300 is disposed between the annular end surfaces 240 of the collars 226 and the annular end surfaces 242 of the bushing 232, in order to prevent the unwanted loss of lubricant out the seams 236. The seal assembly 300 used may be included in any embodiment of a pin joint as described herein.

As shown in FIGS. 1 and 2, the first load ring 312 and second load ring 320 of the seal assembly 300 are identically configured and the first contoured load ring interface 310 and second contoured load ring interface 318 are identically configured. As used herein, "identically configured" means that the shape and size of one feature is within at least an 80% match with another similar feature. The entire assembly may be rotated about the axial plane AP shown in FIG. 2 if desired so that the counterface seal ring member and the lip seal ring member are facing in opposite directions as compared to what is shown in FIG. 2.

In this embodiment, the lip seal ring member 314 is a flexible member and the counterface seal ring member 306 is a rigid member. That is to say, the lip seal ring member may deform without breaking under normal operating conditions while the counterface seal ring does not deform substantially under normal operating conditions. For example, counterface seal ring member may have a hardness ranging from 50-60 HRC (Rockwell Hardness C). On the other hand, the lip seal ring member may have a hardness that ranges from 80-100 Shore A, and particularly 93 Shore A. In yet other embodiments, the load ring may have a hardness that ranges from 55-75 Shore A, and particularly 64 Shore A. In some cases, a mid range value may be employed.

In some embodiments, the lip seal ring member 314 comprises a urethane, a polyurethane, a thermoplastic or a rubber material. Any other suitably flexible or resilient member may be used. Similarly, the counterface seal ring member 306 may comprises a metallic material, such as, but not limited to stainless steel or stellite. Again, any other suitably rigid material may be used. The load rings 312, 320 may comprise a urethane, a polyurethane, a thermoplastic or a rubber material. Any other suitable material may also be used.

As best seen in FIG. 2, the lip seal ring member 314 includes a substantially L-shaped body 322 that that comprises an axially extending portion 324 and a radially extending portion 326. The lip sealing feature 316 of the lip seal ring member 314 extends from the radially extending portion 326 of the body 322 of the lip seal ring member 314. As shown, the lip sealing feature 316 extends in both the axial A and radial R directions and is intended to provide axial interference with the counterface seal ring member 306 to effectuate a fluid tight seal. The radially extending sloped surface 328 of the lip sealing feature 316 provides strength to the lip sealing feature, especially in the radial R direction, helping this portion 316 of the lip seal ring member 314 resist damage from radially extending shearing forces exerted on the tip of the lip sealing feature.

Also, the counterface seal ring member 306 includes a substantially L-shaped body 330 that comprises an axially extending portion 332 and a radially extending portion 334. The radially extending planar seal face 308 is defined by the radially extending portion of the body 334 of the counterface seal ring member 306. This seal face 308, or the entire counterface seal ring member 306, may have various treatments applied to it such as a corrosion and abrasion resistant coating (useful if the member is made from plain carbon steel), any material or coating applied via high velocity oxygen fuel (HVOF) thermal spray process or a coating placed by a physical vapor deposition process, etc.

INDUSTRIAL APPLICABILITY

In practice, the seal assembly and pin joint of FIGS. 1 and 2 are suitable for use with pin connections or joints such as those used for moving booms and sticks or track assemblies or other mechanisms as are used on construction, earth moving or mining machinery and the like. It will be appreciated by those skilled in the art that other types of machines may benefit from these pin joints as well. Machinery may be sold with a seal assembly already installed in one or more pin joints. Alternatively, the seal assembly or portions thereof may be sold as a replacement parts for maintaining or upgrading such joints in the field. For example, the pin joint depicted in FIGS. 1 and 2 are already in the field and use a prior art duo cone seal assembly. The new seal assembly 300 is so configured such that the prior art seal assemblies may be replaced by the new seal assembly 300.

Figure 3:
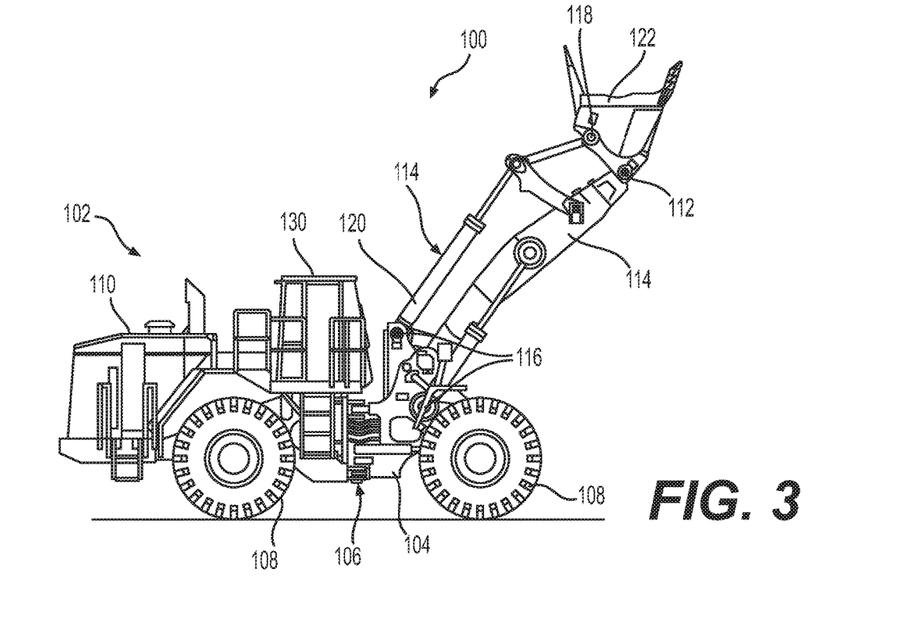
FIG. 3 is a side view of a machine such as a large wheel loader that includes a boom that may having oscillating pin joints employing the seal assembly of FIGS. 1 and 2.

FIG. 3 shows an outline of a large wheel loader as one example for a vehicle or machine 100 that may use pin joints and seal assemblies according to various embodiments discussed herein. Other type of machines, including but not limited to, earth moving, construction and mining equipment of various types including track driven machines may use the various pin joints and seal assemblies as described herein.

In reference to FIG. 3, the vehicle 100 includes an engine frame portion 102 connected to a non-engine frame portion 104 by an articulated joint 106. Each of the engine frame portion 102 and non-engine frame portion 104 includes a respective axle connected to a set of wheels 108. The engine frame portion 102 includes the engine 110 or other motor, which powers the movement of the machine via the wheels while also powering the movement of other accessories of the machine. A cab 130 is also provided where an operator controls the machine.

The vehicle 100 of the illustrated embodiment includes a work implement, which in this case is a bucket 122 connected at the end of a pair of lift arms 114, sometimes referred to as the boom, that are pivotally connected to the non-engine frame portion 104 of the vehicle 100 at hinges 116. Other work implements such as a forklift, shears, etc. may be used.

The bucket 122 is attached to the lift arms 114 at a lower hinge point 112 and an upper hinge point 118. When movement of the bucket is triggered by the operator, the hydraulic cylinder 120 moves the upper lift arm and this motion is transferred to the upper hinge point 118 by a linkage system. Expansion and contraction of the hydraulic cylinders causes various linkages of the boom to move relative to each other in an oscillating manner. Consequently, pin joints that connect these linkages together also oscillate.

Figure 4:
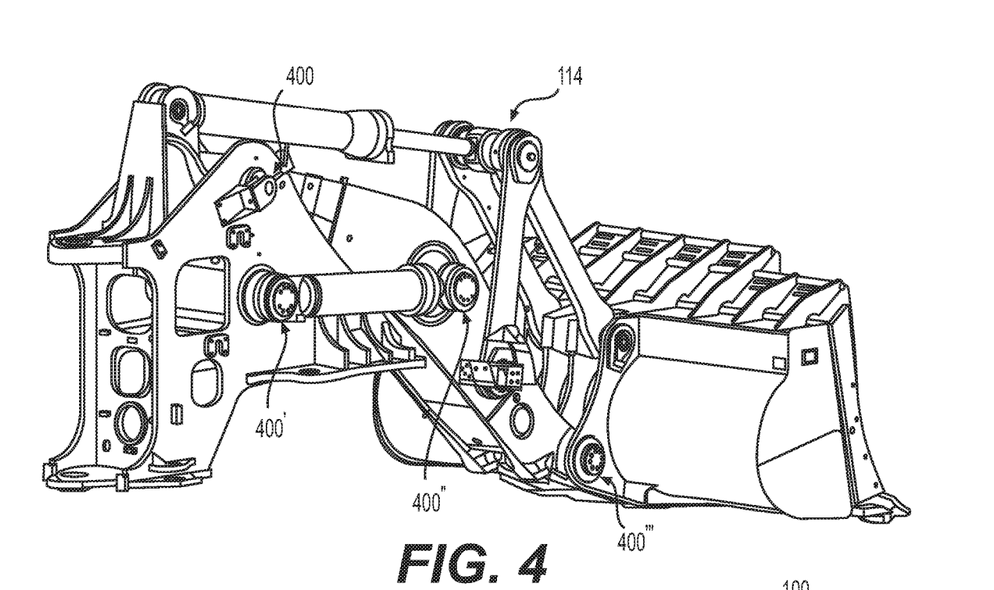
FIG. 4 is a rear perspective view of the boom of the machine of FIG. 3 shown removed from the machine for enhanced clarity.

FIG. 4 shows various pin joints 400 of the boom 114 that provide this necessary oscillating motion and are suitable to use a seal assembly 500 (not shown in FIG. 4) that incorporates many of the same features as discussed with reference to FIGS. 1 and 2. For this embodiment, it is contemplated that pin joints 400 and seal assembly 500 would be sold with the machine 100 as part of the original equipment. However, the seal assemblies, and portions thereof, would likely be sold as replacement parts as well.

Figure 5:
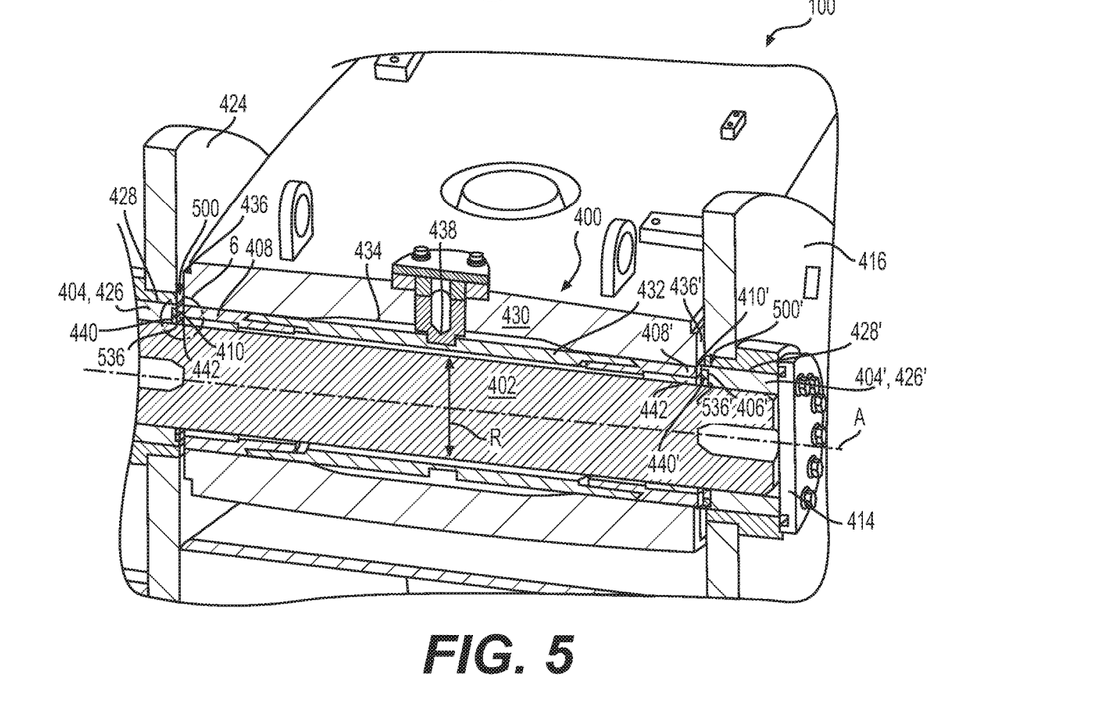
FIG. 5 is a cross-sectional view of a pin joint of the boom of FIG. 4.
Figure 6:
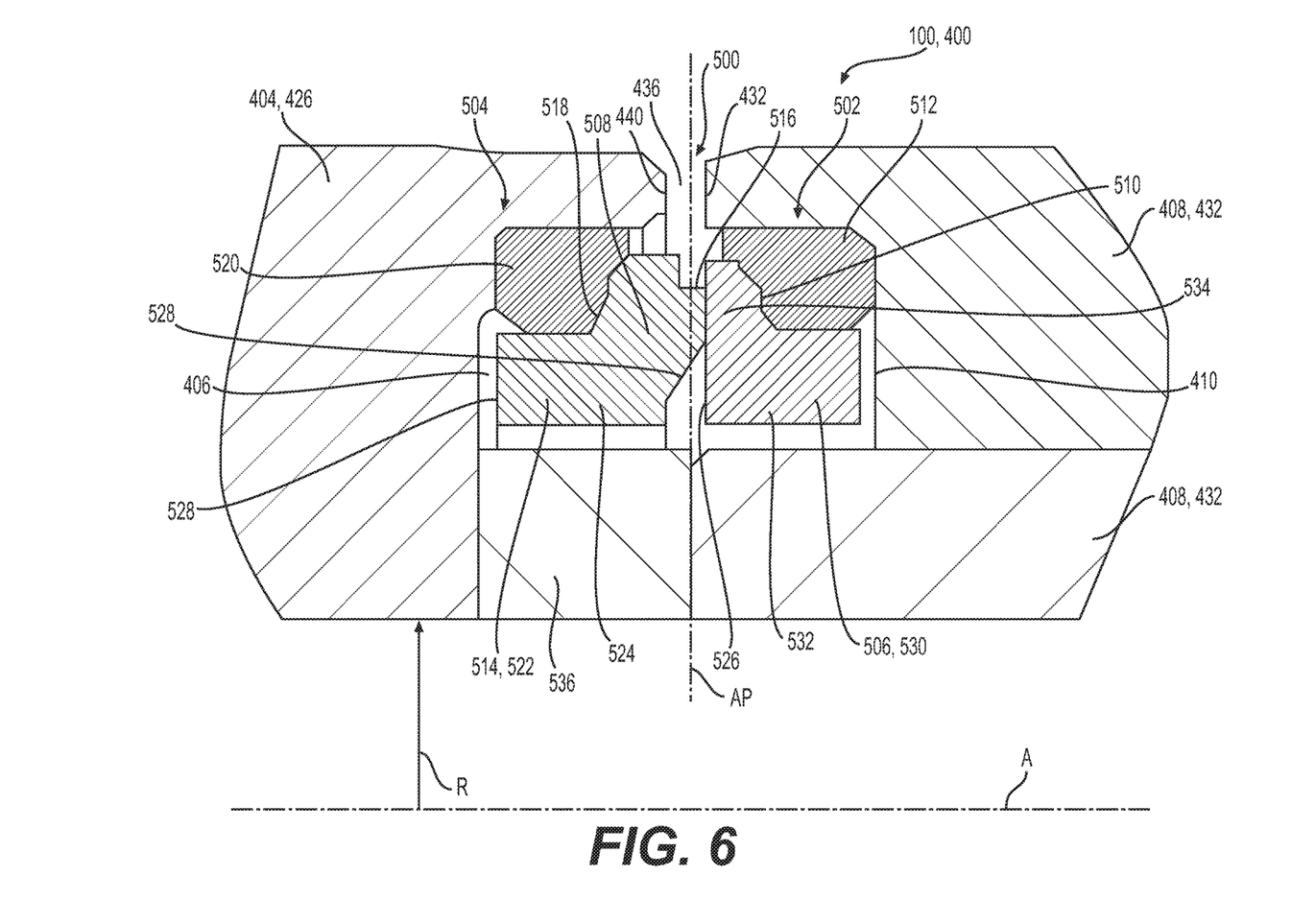
FIG. 6 is an enlarged detail view of the seal assembly of FIG. 5.

Looking at FIGS. 5 and 6, a pin joint 400 for the machine 100 in FIG. 3 is illustrated, wherein the pin 402 defines radial R and axial A directions. The pin joint comprises a first member 404 that defines a first seal groove 406, a second member 408 that defines a second seal groove 410, and a seal assembly 500 that includes a counterface seal ring subassembly 502 and a lip seal ring subassembly 504. The counterface seal ring subassembly 502 is disposed in the first seal groove 406 of the first member 404, and includes a counterface seal ring member 506 that with a radially extending planar seal face 508 and a first contoured load ring interface 510, and a first load ring 512. The lip seal ring subassembly 504 is disposed in the second seal groove 410 of the second member 408, and includes a lip seal ring member 514 with a lip sealing feature 516 and a second contoured load ring interface 518, and a second load ring 520. The first and second members 404, 408 are free to rotate relative to each other and the first load ring 512 engages the first contoured load ring interface 510 of the counterface seal ring member 506 and the second load ring 520 engages the second contoured load ring interface 818 of the lip seal ring member 514. Together, these load rings 512, 520 provide the necessary axial force and radial force to allow the seal assembly 500 to provide an effective fluid tight seal. Also, these load rings 512, 520 as well as the resilient or flexible lip seal ring member 514 allow a suitable amount of variance in the position of the seal components in the axial A and radial R directions as the components move in use.

Focusing on only FIG. 5, a more detailed description of the components of this particular pin joint 400 will now be described. It is to be understood that this by way of example only and that the seal assemblies described herein may be used in all sorts of pin joints used by all sorts of machines. For this joint 400, the pin 402 extends along the axial direction A from one end of the pin joint 400 to the other. At the first end of the pin 412, a cap plate 414 is fastened to the first outer structural member 416 preventing movement of the cap plate 414. As shown in FIG. 5, this prevents movement of the pin 402 to the right along axis A. Though not completely shown, the other end of the pin is similarly captivated with respect to the second outer structural member 424. Collars 426 are provided that are disposed within bores 428 of the first and second outer structural members 416, 424 and that surround the pin 402. The collars 426 are welded to the pin 402.

A middle structural member, often referred to as the bearing housing 430, is located between the first and second outer structural members 416, 424. A bearing or bushing 432 is disposed in a bore 434 of the bearing housing 430. In this embodiment, the bushing 432 includes three components attached to each other. A seam 436 is formed between each collar 426 and the bushing 432, as well as the bearing housing 430 and each outer structural member 416, 424. Rotation back and forth about the axis A of the pin 402 is needed for this particular joint 400 to work. Also, a pin retainer 438, which is biased by a spring or washers toward axis A, is disposed in the bearing housing 430 and the bushing 432 to hold the pin 402 in place. It is desirable to prevent the lubricant from flowing out the seam 436 between the bearing housing 430 and the outer structural member 416, 424. Hence, a seal assembly 500 is disposed between the annular end surfaces 440 of the collars 426 and the annular end surfaces 442 of the bushing 432, in order to prevent the unwanted loss of lubricant out the seams 436.

The seal assembly 500 used may be included in any embodiment of a pin joint as described herein.

As shown in FIGS. 5 and 6, the first load ring 512 and second load ring 520 of the seal assembly 500 are identically configured and the first contoured load ring interface 510 and second contoured load ring interface 518 are similarly configured. That is to say, there are some slight differences between these ring interfaces. The entire assembly may be rotated about the axial plane AP shown in FIG. 6 if desired.

In this embodiment, the lip seal ring member 514 is a flexible member and the counterface seal ring member 506 is a rigid member. That is to say, the lip seal ring member may deform without breaking under normal operating conditions while the counterface seal ring does not deform substantially under normal operating conditions. This may not be the case for other embodiments.

In some embodiments, the lip seal ring member 514 comprises a urethane, a polyurethane, a thermoplastic or a rubber material. Any other suitably flexible or resilient member may be used. Similarly, the counterface seal ring member 506 may comprises a metallic material, such as, but not limited to stainless steel or stellite. Again, any other suitably rigid material may be used. The load rings 512, 520 may comprise a urethane, a polyurethane, a thermoplastic or a rubber material. Any other suitable material may also be used.

As best seen in FIG. 6, the lip seal ring member 514 includes a substantially L-shaped body 522 that that comprises an axially extending portion 524 and a radially extending portion 526. The lip sealing feature 516 of the lip seal ring member 514 extends from the radially extending portion 526 of the body 522 of the lip seal ring member 514. As shown, the lip sealing feature 516 extends in both the axial A and radial R directions and is intended to provide axial interference with the counterface seal ring member 506 to effectuate a fluid tight seal. The radially extending sloped surface 528 of the lip sealing feature 316 provides strength to the lip sealing feature, especially in the radial R direction, helping this portion 516 of the lip seal ring member 514 resist damage from radially extending shearing forces exerted on the tip of the lip sealing feature.

Also, the counterface seal ring member 506 includes a substantially L-shaped body 530 that comprises an axially extending portion 532 and a radially extending portion 534. The radially extending planar seal face 508 is defined by the radially extending portion of the body 534 of the counterface seal ring member 506. This seal face 508, or the entire counterface seal ring member 506, may have various treatments applied to it such as a corrosion and abrasion resistant coating (useful if the member is made from plain carbon steel), any material or coating applied via high velocity oxygen fuel (HVOF) thermal spray process or a coating placed by a physical vapor deposition process, etc.

The pin joint 400 of FIGS. 5 and 6 also uses a thrust ring or washer 536 disposed beneath the lip seal ring member 514 and between the collar 426 and the sleeve bearing or busing 432. This component may be omitted in other pin joints.

In many embodiment, the outer structural members are fixed and the bearing housing is movable relative to the structural member, allowing oscillating movement. The opposite may be true for other embodiments or other types of motion may be allowed such as oscillating movement between both the structural member and the housing. For example, the pin joints and seal assemblies as described herein may also be used in rotating joints that rotate continuously in a single direction, etc.

Figure 7:
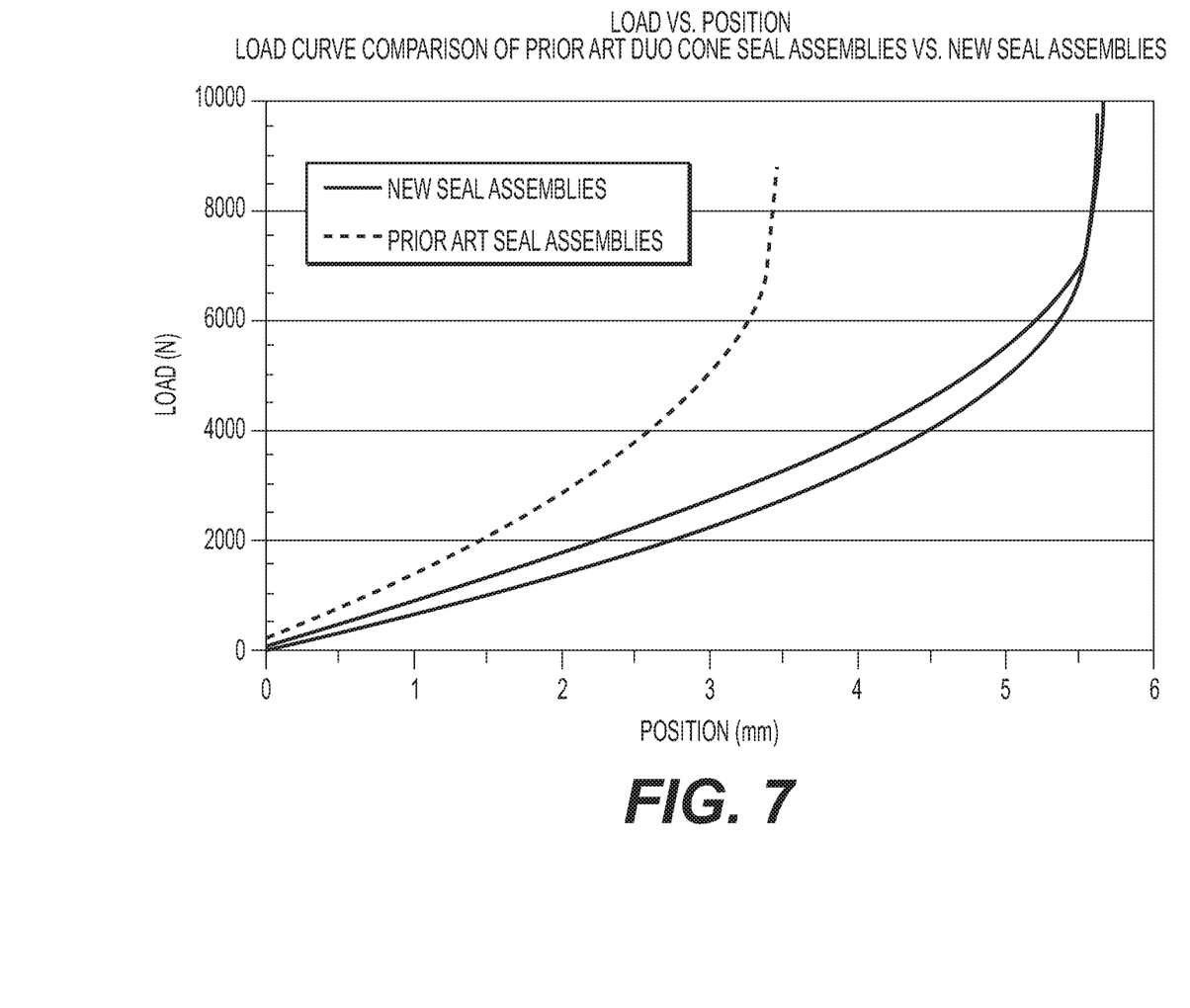
FIG. 7 depicts a graph showing a load curve comparison of a seal assembly according to an embodiment of the present disclosure versus a prior art seal assembly.

FIG. 7 depicts a graph showing a load curve comparison of a seal assembly according to an embodiment of the present disclosure versus a prior art seal assembly. As can be seen, the new seal assemblies are able to accommodate twice the axial deflection as compared to the prior art seal while still providing a suitable amount of sealing load. Also, effective spring constant for the new seal is greater than the effective spring constant for the prior art seal. Hence, the new seal provides a more reliable fluid tight joint that the prior art seal assemblies and joints associated therewith.

It will be appreciated that the foregoing description provides examples of the disclosed design and function. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A seal assembly for use in a dynamic pin joint defining axial and radial directions, the seal assembly comprising:
    a counterface seal ring subassembly including
        a counterface seal ring member that includes a radially extending planar seal face and a first contoured load ring interface; and
        a first load ring; the seal assembly further comprising
    a lip seal ring subassembly including
        a lip seal ring member that includes a lip sealing feature and a second contoured load ring interface; and
        a second load ring;
        wherein the lip seal ring member is a flexible member having a Shore A hardness ranging from 80-100 and the counterface seal ring member is a rigid member having a Rockwell C hardness ranging from 50-60, and the first load ring and the second load ring have a Shore A hardness ranging from 55-75.

2. The seal assembly of claim 1 wherein the first load ring contacts the first contoured load ring interface and the second load ring contacts the second contoured load ring interface.

3. The seal assembly of claim 1, wherein the lip seal ring member comprises a urethane, a polyurethane, a thermoplastic or a rubber material.

4. The seal assembly of claim 1 wherein the counterface seal ring member comprises a metallic material.

5. The seal assembly of claim 1 wherein the metallic material includes stainless steel or stellite.

6. The seal assembly of claim 1 wherein the first load ring comprises a urethane, a polyurethane, a thermoplastic or a rubber material.

7. A pin joint for a machine comprising:
a pin defining an axial direction and a radial direction;
a first member that defines a first seal groove;
a second member that defines a second seal groove;
a seal assembly including
   a counterface seal ring subassembly disposed in the first seal groove of the first member, the counterface seal ring sub assembly including
      a counterface seal ring member that includes a radially extending planar seal face and a first contoured load ring interface, and
   a first load ring; and
   a lip seal ring subassembly disposed in the second seal groove of the second member, the lip seal ring subassembly including
      a lip seal ring member that includes a lip sealing feature and a second contoured load ring interface, and
      a second load ring;
wherein the first and second members rotate relative to each other and the first load ring engages the first contoured load ring interface of the counterface seal ring member and the second load ring engages the second contoured load ring interface of the lip seal ring member, and the lip seal ring member is a flexible member having a Shore A hardness ranging from 80-100 and the counterface seal ring member is a rigid member having a Rockwell C hardness ranging from 50-60, and the first load ring and the second load ring have a Shore A hardness ranging from 55-75.

8. The pin joint of claim 7, wherein the lip seal ring member is a flexible member and the counterface seal ring member is a rigid member.

9. The pin joint of claim 8, wherein the lip seal ring member comprises a urethane, a polyurethane, a thermoplastic or a rubber material.

10. The pin joint of claim 8 wherein the counterface seal ring member comprises a metallic material.

11. The pin joint of claim 10 wherein the metallic material includes stainless steel or stellite.

12. The pin joint of claim 7 wherein the first and the second load rings comprise a urethane, a polyurethane, a thermoplastic or a rubber material.

13. The pin joint of claim 7 wherein the lip seal ring member includes a substantially L-shaped body that that comprises an axially extending portion and a radially extending portion.

14. The pin joint of claim 13 wherein the lip sealing feature of the lip seal ring member extends from the radially extending portion of the body of the lip seal ring member.

15. The pin joint of claim 7 wherein the counterface seal ring member includes a substantially L-shaped body that comprises an axially extending portion and a radially extending portion.

16. The pin joint of claim 15 wherein the radially extending planar seal face is defined by the radially extending portion of the body of the counterface seal ring member.

* * * * *